United States Patent Office 3,207,666
Patented Sept. 21, 1965

3,207,666
METHOD OF PRODUCING DRY FREE FLOWING PREPARATIONS WHICH ARE STABLE IN AIR AND CONTAIN AN OXIDIZABLE ORGANIC SUBSTANCE
Henk Houtgraaf and Evert Jan ten Ham, Van Houtenlaan, Weesp, Netherlands, assignors to North American Philips Company Inc., New York, N.Y., a corporation of Delaware
No Drawing. Filed Apr. 11, 1960, Ser. No. 21,128
Claims priority, application Netherlands, Apr. 15, 1959, 238,195
28 Claims. (Cl. 167—82)

This invention relates to methods of providing a dry, free flowing powder containing highly oxidizable valuable organic substances. More particularly, this invention relates to a method of forming dry free flowing beadlets containing a highly oxidizable valuable organic substance in which the beadlets are all well shaped spheres and the valuable organic substance is well protected from oxidation by air.

One method that has been employed in producing such beadlets consists in forming an aqueous solution of an organic film forming colloid and a carbohydrate and mixing into this solution the valuable organic substance either by itself or dissolved in oil together with antioxidants, chelating agents and other stabilizing compounds and drying the resultant aqueous emulsion by spraying it into a hot gas. This method, while being comparatively simple, has the disadvantages of requiring the use of an expensive drying tower and of forming porous gas-filled particles which are not smoothly spherical when examined under a microscope.

According to another method the aqueous emulsion may be dispersed in an oil which is insoluble in water, the oil being removed by washing after solidification of the heterogeneous phase. This so-called double emulsion technique provides satisfactory spherical particles. However, this method is expensive and comparatively complicated owing to the fact that the particles must be washed with suitable solvents to remove the oil and then must be dried. In addition, the solvents must be regenerated continually and this adversely affects the economy of the process.

It has also been proposed to atomize the emulsion into a cloud of a powder which contains starch and may be moved in the form of a layer on a band conveyor. In this process, the collecting powder absorbs part of the water present in the sprayed particles, however, the amount absorbed is not such as to enable additional drying by heating to be dispensed with. In addition, this method is subject to the limitation that the collecting powder cannot be completely separated from the solidified sprayed emulsion particles, so that these always contain at least about from 15 to 20% of the powdered starch without the latter contributing to the stability of the preparation. A further limitation of this method consists in that the collecting powder becomes unusable in course of time due to its moisture withdrawing action and hence must be regenerated.

It is a principal object therefor of this invention to provide a simple, less costly method of producing dry free flowing beadlets containing in a form protected from oxidation by air, at least one valuable, air oxidizable, organic substance.

This and other objects of the invention will be apparent from the description that follows.

According to the invention, dry, free flowing beadlets containing one or more valuable, air oxidizable organic substances in a form protected from the air are produced by forming a highly viscous aqueous liquid containing said valuable organic substance, at least one antioxidant, at least one organic film forming substance and at least one carbohydrate; and atomizing said aqueous liquid through air held at room temperature, and impinging the resultant solidifying droplets upon a solid collecting surface moving relative to the axis of the stream of said solidifying droplets, said collecting surface being formed of a material to which the solidifying droplets do not adhere. The viscosity of the aqueous liquid is considered to be satisfactory for use in the method of the invention when it lies between 500 and 1300 centipoises at 70° C. However, the best results are obtained when the aqueous liquid has a viscosity of from 550 to 850 at 70° C.

Since, in accordance with the invention, the aqueous liquid is atomized in air at room temperature, the method need not be carried out in an expensive drying tower. Also, the sprayed particles need not pass through a collecting medium. By dispensing with operations which render the conventional technique laborious and complicated, the method in accordance with the invention is technically simple and furthermore can be carried out continuously.

As examples of the valuable oxidizable, organic substances are the vitamins, particularly A, $D_2$, $D_3$ and E, antibiotics such as penicillin, Aureomycin and bactracin, perfumes and albumins.

The valuable organic substances can be dissolved in the aqueous liquid. If, however, the substances are not water-soluble but can be dissolved in fats and/or oils, the aqueous liquid may contain the substance to be protected in the form of a finely divided oil solution. This embodiment is preferred, for example, in protecting fat-soluble vitamins A, D and E, so that with these vitamins preferably oil-in-water emulsions are produced. The oil may contain the vitamins A and/or D partially in (micro-) crystalline condition.

To the aqueous phase there may be added at least one antioxidant such as the butylated hydroxy phenols, for example 4-methyl-2,6-ditertiary butyl phenol, 2- or 3-tertiary butyl-4-hydroxy anisol and mixtures thereof, nordihydroguaiaretic acid, the alkyl gallates such as the butyl, propyl and octyl gallates, hydroquinone and vitamin C, synergists for the antioxidants such as citric acid, the alkyl phosphates and licithin and complex forming agents for inorganic ions such as ethylene diamine tetraacetic acid and the alkali salts thereof for example the sodium salt.

The aqueous phase must contain at least one organic film forming colloid suitable for forming a coating impervious to air for the valuable organic substance. Examples of suitable film forming colloids are pectin and gelatin. The aqueous phase should also include a carbohydrate such as glucose, sucrose or lactose for filling in the space between the air impervious coating and the valuable organic substance.

The viscosity requirements are satisfied when the aqueous liquid comprises from 65 to 45% of water while the remainder (that is to say, the solid constituents including any oily substances) comprises from 10 to 65% of a filming colloid such as gelatin or pectin, from 8 to 55% of at least one carbohydrate such as glucose, lactose, sucrose and from 20 to 40% of the valuable organic substance or a solution or dispersion thereof in a water-immiscible liquid, for example oil. Especially satisfactory results are obtained if the aqueous liquid contains from 55 to 45% of water while the remainder contains from 35 to 65% of gelatin, from 8 to 35% of glucose and from 20 to 40% of the valuable organic oxidizable substance or a solution or dispersion thereof in oil. The glucose may be replaced (entirely or in part) by dextrin, and this is of advantage to obtain particles after atomization which are capable of withstanding a high pressure without deformation.

It has further been found that products having such high gelatin contents have a particularly satisfactory sprayability, but that the stability of the valuable organic substance can be further improved by reducing the gelatin contents to from 35 to 45% and fixing the carbohydrate contents at from 25 to 35%. Preparations obtained in this manner show excellent stability.

In spraying it is of advantage for the aqueous liquid to have the highest possible temperature, for example between 55° C. and 80° C. However, natural limits are set by the stability of the valuable organic substance and of the emulsion, if the aqueous liquid is in this form.

It is advantageous for the aqueous liquid while it is being forced towards the orifice of the atomizer to be subjected to an additional heating in the last part of the supply pipes. This enables the temperature of the atomizing aqueous liquid to be raised to from 85 to 90° C. without injury to the oxidizable substance. The advantage of this method consists in that an emulsion having a very high viscosity of, for example, from 1000 to 1200 centipoise at a temperature of 70° C. can be used so that the time of solidification is reduced and the additional drying requires little time.

There are various suitable systems of atomizing the liquid, although the embodiment influences the result.

In principle, the aqueous liquid may be sprayed onto a rotary disc so that it is broken up into a very fine mist. As a rule, the capacity of atomizers of this type is large, but they have a limitation in that a spray cone is produced which has a great apical angle and this would require the use of an uneconomically wide band conveyor.

Therefore, in carrying out the method of the invention, a technique is preferred in which the emulsion to be atomized is forced through a narrow orifice. Suitable devices are so-called "pressure nozzles," "swirl nozzles" or "two-fluid nozzles," also called "2-phase atomizers." Since the first two types of atomizers can give a high speed to the emulsion drops, which is undesirable since the droplets might strike the collecting band with too great a force, in the method of the invention an atomizer of the last-mentioned type is preferred since it is not subject to the said limitation.

A further advantage of the last type of atomizer mentioned consists in that it permits of large variations of the rate of atomization of the emulsion, which is not the case with the above-mentioned rotary discs since there are critical limits to the number of revolutions and to the viscosity of the emulsion.

When using the said "2-phase atomizers," a comparatively large amount of air is passed through the atomizer in atomizing the liquid. Due to the eddy flow thus produced, the aqueous liquid is carried along and broken up into very small droplets. A suitable atomizer may have a diameter at the orifice of from 1 to 5 mms. and enables droplets to be obtained having a size of from 100 to 600 microns in the non-dried condition. At the orifice of this atomizer the spraying rate of the aqueous liquid may be from 0.1 l. to 1 l. per minute, the excess pressure exerted on the liquid above atmospheric pressure being from about 0.2 to 1 atmosphere.

The amount of air which together with the emulsion passes through the orifice is more or less dependent upon the atomizer used, however, as a rule an amount of from 100 to 200 litres of air per minute under an excess pressure of from 2 to 3.5 atmospheres will produce the desired result.

When the aqueous liquid is atomized in the above-mentioned manner, particles are produced which have a highly satisfactory spherical shape and which owing to the high proportion of dry substance and the great gelability commence to solidify in a very short time. In order to give the sprayed particles sufficient time for solidification, it is essential that the atomization should not be performed too close to the collecting layer. If the atomizer nozzle points downwards, the minimum distance should be 1.80 metres. The atomizer nozzle may alternatively point upwards. In this event, the arrangement preferably is made so that the path along which the particles fall is at least 1.80 metres. A trajectory of 4 metres is amply sufficient in most cases, and with a trajectory of 2.20 metres already very satisfactory results are obtained.

After atomization, the particles are collected on a solid moving layer to which the solidified particles adhere only to a very slight degree. This layer need not have a predetermined shape. It may be in the form of a normal band conveyor or of a disc or conical surface revolving about its axis. In all these cases, the atomizer is preferably arranged so that the axis of the spray cone is at right angles to the plane of the band conveyor or coincides with the axis of the disc or conical surface.

The speed of the band conveyor or the period of revolution of the disc or conical surface is preferably adjusted so that the particles do not fall one on top of the other. The particle size obviously depends upon the spraying rate, the angle of aperture of the spray cone and the width of the band or the diameter of the disc. With the above-mentioned conditions of a spray rate of from 0.2 to 1 litre of aqueous dispersion per minute and a fall path for the particles of from 1.8 to 4 metres, the best results were achieved with a band speed of from 0.1 to 1 m. per second.

If the liquid is sprayed onto a band conveyor, the solidified particles can be readily removed by means of brushes. This is also the case when a rotary disc is used as the moving layer. However, in this latter event the atomizing process is preferably interrupted periodically for the particles to be removed. This is not so much the case when the moving layer is shaped in the form of a conical surface revolving on its apex. In this event, the particles drop by their own weight and collect in the apex part of the conical surface. By aperturing this apex, the particles may even be continuously conducted away.

For a satisfactory operation of the invention, the choice of the material of the surface of the moving layer is of great importance. This material must be water-repellent to prevent the particles from adhering to the surface. If no exacting requirements are to be satisfied by the spherical shape of the sprayed particles, hard surfaces are very suitable, for example glass, metal or ceramic surfaces. A suitable metal surface is, for example, a surface of stainless steel or copper which may be nickel-, chrome- or zinc-plated. Preferably the surface of these hard materials is not smooth but rough. This reduces the area of contact of the layer with each particle and facilitates the removal of the particles from the layer. If a metal surface is chosen, use may be also made of a metal gauze, for example copper gauze or gauze made of stainless steel. Obviously, the mesh width must be smaller than the mean diameter of the sprayed particles. A mesh width of from 10 to 80 microns, preferably of from 45 to 50 microns, gives very satisfactory results. The use of metal gauze as the collecting layer has the further advantage that such surfaces with the above-mentioned mesh widths are resilient so that the particles are not subjected to great deformation when striking the layer. A band conveyor made of a metal gauze, which usually is comparatively ductile and offers little resistance to deformation, will bulge in course of time. In this event, the band is preferably provided with a strengthening layer to counteract deformation.

It should be noted that, when glass, ceramic or metal layers are used, either as gauze or as a continuous surface, attention must be paid to the water-repellent properties. In most cases, the surface must be treated with a water-repellent substance. Furthermore it is of importance that this substance should also be able to act as a lubricant. Suitable substances are, for example, talc, solid hydrogenated vegetable or animal oils, metal salts of higher aliphatic carboxylic acids, for example calcium-, magnesium-, sodium- or aluminum-stearate or -palmitate, and also silicates for example Na-, Ca- or Mg-silicate. In particular, satisfactory results are obtained with calcium- or magnesium-stearate or -palmitate or mixtures thereof, since owing to the surface activity of the stearate or palmitate the emulsion droplets assume an almost perfect spherical shape on the band. These water-repellent lubricants are applied to the collecting layer as a coating from 0.1 to 1 mm. thick. This may be effected by dressing the layer with the finely powdered lubricant or by spraying a suspension of the powder in a volatile dispersing agent, for example ethyl alcohol, onto the layer. Alternatively the powdered lubricant may be rubbed into the layer.

If the spherical shape of the sprayed particles must satisfy exacting requirements after their collection, the use of a collecting layer comprising a fabric of natural or artificial fibres is to be preferred to a collecting layer made of a hard material.

Rough-haired fabrics are most suitable, for example the so-called coarse fabrics of linen, cotton, hemp and furthermore plush velvet and corduroy. The proper area of contact between the particles and layers of this type is very small, since the particles remain lying on or between the fine hairs of the fabric proper, so that the sprayed particles do not adhere in a high degree to this type of material.

In general it has been found that these fabrics are satisfactory if they have from 10,000 to 250 upright hairs per sq. cm. (when the sprayed particles are of the order of magnitude of from 100 to 600 microns).

As has been stated above, the surface must be water-repellent and this also applies when a fabric is used as base. The fabric may have these properties by the nature of the yarns chosen, however, otherwise the fabric can be subjected to a suitable treatment, for example with lecithin or silicones.

With fabrics formed of artificial yarns such treatment can generally be dispensed with and for this reason also fabrics from this material are highly suitable for carrying out the method in accordance with the invention. Suitable fabrics are, for example, fabrics of synthetic material known under the trade names "Nylon Lidra Sub," "Nylon," "Saran," "Orlon," "Dynel," "Dacron" and "Arnel."

It should be noted that the fabrics are particularly suitable in embodiments of the invention in which the sprayed particles are collected on a band conveyor.

After the particles have been removed from the moving base, for example by means of a simple scraping or brushing system, it is desirable for the particles to be dried. This can be effected in normal manner in a drying drum by maintaining the particles at a temperature of from 50° C. to 75° C., for example 65° C., for a few hours, for example for from 2 to 5 hours. The particles obtained are hard but not brittle and highly suitable for conversion into tablets.

The invention will now be described in greater detail with reference to the following examples:

*Example I*

10 parts of glucose and 60 parts of gelatin were dissolved in 122.2 parts of water a solution, 23.3 parts of vitamin A palmitate in oil (1.5 S.U./g.), which contained 6.7 parts of 4-methyl-2,6-ditertiary butylphenol as an antioxidant and was heated to 70° C., was added to the first-mentioned solution. The mixture was homogenized and subsequently heated to a temperature of 70° C. At this temperature the viscosity of the emulsion was 600 centipoise.

The liquid was atomized by means of a so-called 2-phase atomizer after a short pre-heating treatment by which the liquid was heated to 90° C. The nozzle orifice had a diameter of 5 mms. The amount of liquid sprayed per minute was from 500 to 600 millilitres. The fall height was 2.20 metres.

The sprayed droplets were collected on, and conducted away by means of a band conveyer made of canvas which had been treated with calcium stearate to render the surface water-repellent. The speed of the band was 50 cms. per second.

The solidified particles were collected and then dried at a temperature of 40° C. in a rotary drying drum for about 4 hours. The obtained preparation contained 350 S.U. of vitamin A per kg. The particles were almost perfectly spherical and had diameters between 100 and 600 microns.

*Example II*

In the manner described in Example I, an aqueous emulsion was made from 60 parts of gelatin, 12.2 parts of glucose syrup, 23.3 parts of a solution of vitamin A-palmitate in oil (concentration 1.5 S.U./g.), 6.7 parts of ionol and 120 parts of water. The emulsion had a viscosity of 650 centipoises at 70° C.

The emulsion was atomized under the conditions described in Example I onto a band conveyor made of rubber with embedded textile fabric, which was dressed with magnesium stearate. Round particles were obtained having diameters varying between 100 and 600 microns, which were subsequently dried at 65° C. for 4 hours.

*Example III*

In the manner described in Example I, an emulsion was made from 40 parts of gelatin, 30 parts of glucose, 23.3 parts of a solution of vitamin A-palmitate in oil (concentration 1.5 S.U./g.), 6.7 parts of 4-methyl-2,6-ditertiary butylphenol and 92.3 parts of water. At 70° C. the emulsion had a viscosity of 750 centipoises.

Likewise in the manner described in Example I, this emulsion was atomized after being pre-heated to a temperature of from 80° C. to 85° C. The sprayed particles were collected on a band conveyor made of copper gauze having a mesh diameter of 45 microns, into which gauze, aluminum stearate had been rubbed. Substantially perfectly spherical particles were produced having a diameter of from 200 to 700 microns after drying at a temperature of 50° C. for 7 hours.

*Example IV*

In the manner described in Example I, an emulsion was made from 40 parts of gelatin, 36.2 parts of glucose syrup, 21.8 parts of vitamin A-acetate dissolved in oil (2.5 S.E./g.), 8.2 parts of butyl-hydroxy-anisol and 86.1 parts of water. At 70° C., the viscosity was 500 centipoises. After being pre-heated at a temperature of 85° C., the emulsion was atomized by means of a 2-phase atomizer having an orifice of 5 mms. onto a band conveyor made of a fabric of synthetic fibres of a material known under the trade name "Nylon Lidra Sub." The material had a rough surface into which had been rubbed a mixture of calcium and magnesium stearate. The mean trajectory of the particles was 2.20 metres. The speed of the band conveyor was 40 cms. per second. The particles were dried at 45° C. for 5 hours.

*Example V*

An emulsion was prepared from 60 parts of gelatin, 10 parts of glucose, 25 parts of soya oil in which vitamin $D_3$ was dissolved to a concentration of 4 S.U./g., 4 parts of nordihydroguaiaretic acid, 1 part of tocopherol, small amounts of citric acid and lecithin, and finally 122.2 parts of water. At 70° C., the emulsion had a viscosity of 700 centipoises. It was atomized at the rate of 0.5 l. per minute at a temperature of 85° C. by means of a 2-phase atomizer having a diameter of 5 mms. The mean trajectory of the particles was 3 meters. The solidifying droplets were collected on a band conveyor made of a fabric consisting of a rough material known under the trade name "Duracal." The band had a speed of 75 cms. per second. After the particles had been collected, they were dried at a temperature of 45° C. for 5 hours.

While we have described our invention in connection with specific embodiments and applications, other modifications thereof will be readily apparent to those skilled in this art without departing from the spirit and scope of the invention as defined in the appended claims.

What we claim is:

1. A method of producing dry free flowing beadlets stable in air and containing an air oxidizable valuable organic substance comprising the steps, forming an aqueous liquid containing said oxidizable organic substance, at least one antioxidant, an organic film-forming colloid and a carbohydrate selected from the group consisting of glucose, sucrose and lactose, said aqueous liquid having at 70° C. a viscosity between about 500 and 1300 centipoises, atomizing said liquid into air held at room temperature, impinging the resultant droplets upon a base layer moving relative to the resultant droplets, said base layer being formed of a material repellent to said droplets, and removing the resultant hardened droplets from said base layer.

2. A method of producing dry free flowing beadlets stable in air and containing an air oxidizable valuable organic substance comprising the steps, forming an aqueous liquid containing said oxidizable organic substance, at least one antioxidant, a synergist for said antioxidant, an organic film-forming colloid and a carbohydrate selected from the group consisting of glucose, sucrose and lactose, said aqueous liquid having at 70° C. a viscosity between about 500 and 1300 centipoises, atomizing said liquid into air held at room temperature, impinging the resultant droplets upon a base layer moving relative to the resultant droplets, said base layer being formed of a material repellent to said droplets, and removing the resultant hardened droplets from said base layer.

3. The method of claim 2 wherein the organic film forming colloid is a member of the group consisting of gelatin and pectin.

4. The method of claim 3 wherein the aqueous liquid contains from 65 to 45% by weight of water and the remainder 35 to 65% solids comprising 10 to 65% of gelatin, 8 to 55% of a carbohydrate and 20 to 40% of water-immiscible solution of the oxidizable organic substance.

5. The method of claim 4 wherein in that the aqueous liquid consists of an emulsion of oil in water, the heterogeneous oil phase being a solution in oil of at least one of the vitamins selected from the group consisting of A, D and E, while the aqueous phase contains gelatin and a carbohydrate.

6. The method of claim 1 wherein the temperature of the aqueous liquid during atomization lies between 55° C. and 90° C.

7. The method of claim 6, wherein immediately before the atomization the aqueous liquid is heated to a temperature between 75° C. and 90° C.

8. The method of claim 1, wherein the aqueous liquid has a viscosity of from 550 to 850 centipoises at the temperature of the atomization.

9. The method of claim 1, wherein per minute, 0.2 to 1 liter of the aqueous liquid is atomized through an orifice of from 1 to 5 mms. under an excess pressure above atmospheric pressure of from 0.2 to 1 atmosphere, from 100 to 200 litres of air under an excess pressure of from 2 to 3½ atmospheres above atmospheric pressure passing through the orifice per minute in order to obtain particles which upon atomization have diameters of from 100 to 600 microns and are collected in solidifying state on a band conveyor which is arranged under the atomizer orifice and moves at a speed of from 0.1 to 1 m. per second, after which the solidified particles are removed from the band and dried.

10. The method of claim 9, wherein the orifice is from 1.8 to 4 metres above the moving collecting layer.

11. The method of claim 10, wherein in that between the orifice and the collecting layer there is produced an air stream in a direction opposite to the direction of fall of the particles.

12. The method of claim 1 wherein the moving base layer is made of fabrics having a slightly rough fibrous surface and a small contact area.

13. The method of claim 1, wherein the moving base layer consists of textile-reinforced rubber.

14. The method of claim 1, wherein the moving base layer consists of copper gauze having a mesh diameter of from 10 to 100 microns.

15. The method of claim 1, wherein the moving base layer consists of steel gauze having a mesh diameter of from 10 to 100 microns.

16. The method of claim 1, wherein the moving base layer consists of canvas.

17. The method of claim 1, wherein the moving base layer consists of a synthetic fiber.

18. The method of claim 1, wherein the moving base layer consists of metal gauze having a mesh diameter of from 10 to 100 microns.

19. The method of claim 18, wherein through the gauze at the point at which the sprayed particles impinge on it there is produced an air stream in a direction opposite to the direction of fall of the particles.

20. The method of claim 1, wherein the water-repellent properties of the surface are increased by treatment with a powder having water-repellent properties.

21. The method of claim 20, wherein the water-repellent powder is a salt of an aliphatic carboxylic acid containing from 16 to 30 carbon atoms and selected from the group consisting of calcium, magnesium, sodium, and aluminum stearate.

22. The method of claim 21 wherein the water-repellent powder is calcium stearate.

23. The method of claim 21 wherein the water-repellent powder is magnesium stearate.

24. The method of claim 1, wherein the particles are removed from the base layer by brushing.

25. A method of producing dry free flowing beadlets stable in air and containing a fat soluble vitamin comprising the steps, forming a warm aqueous emulsion containing said fat soluble vitamin, at least one antioxidant, a gelable organic film-forming colloid and a sugar, atomizing said warm aqueous emulsion in droplet form into air held at room temperature and permitting the droplets to fall through a distance of 4 meters onto a collecting conveyer belt.

26. The method of claim 1 wherein the moving base layer consists of a natural fiber fabric.

27. The method of claim 1 wherein the moving base layer consists of glass.

28. The method of claim 20 wherein the water-repellent powder is a salt of an aliphatic carboxylic acid containing from 16 to 30 carbon atoms and selected from the group consisting of calcium, magnesium, sodium, and aluminum palmitate.

References Cited by the Examiner

UNITED STATES PATENTS

| | | | |
|---|---|---|---|
| 2,756,177 | 7/56 | Cannalonga et al. | 167—81 |
| 2,777,797 | 1/57 | Hochberg | 167—81 |
| 2,777,798 | 1/57 | Hochberg | 167—81 |
| 2,796,380 | 6/57 | Maietta | 167—81 |
| 2,897,119 | 7/59 | Dunn | 167—81 |

JULIAN S. LEVITT, *Primary Examiner.*

MORRIS O. WOLK, FRANK CACCIAPAGLIA, JR., LEWIS GOTTS, *Examiners.*